United States Patent
Cheon et al.

(10) Patent No.: US 11,590,859 B2
(45) Date of Patent: Feb. 28, 2023

(54) SYSTEM AND METHOD FOR CONTROLLING RELAY USING FLIP-FLOP

(71) Applicant: LG CHEM, LTD., Seoul (KR)

(72) Inventors: Junpil Cheon, Daejeon (KR); Sang Rae Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 224 days.

(21) Appl. No.: 17/041,764

(22) PCT Filed: Sep. 27, 2019

(86) PCT No.: PCT/KR2019/012600
§ 371 (c)(1),
(2) Date: Sep. 25, 2020

(87) PCT Pub. No.: WO2020/067773
PCT Pub. Date: Apr. 2, 2020

(65) Prior Publication Data
US 2021/0086656 A1    Mar. 25, 2021

(30) Foreign Application Priority Data
Sep. 28, 2018   (KR) .................. 10-2018-0115723

(51) Int. Cl.
*H02J 7/00*       (2006.01)
*B60L 58/10*      (2019.01)
(Continued)

(52) U.S. Cl.
CPC ............ *B60L 58/10* (2019.02); *B60L 3/0046* (2013.01); *B60L 50/60* (2019.02); *Y02T 90/14* (2013.01)

(58) Field of Classification Search
CPC ........ B60L 58/10; B60L 3/0046; B60L 50/60; Y02T 90/14
(Continued)

(56) References Cited

U.S. PATENT DOCUMENTS

| | | |
|---|---|---|
| 4,491,768 A | 1/1985 | Slicker |
| 5,610,814 A | 3/1997 | Sugioka et al. |

(Continued)

FOREIGN PATENT DOCUMENTS

| | | | |
|---|---|---|---|
| JP | 5644560 B2 | 12/2014 | |
| JP | 6074586 B2 | 2/2017 | |

(Continued)

OTHER PUBLICATIONS

International Search Report (PCT/ISA/210) issued in PCT/KR2019/012600 dated Jan. 6, 2020.

*Primary Examiner* — Zixuan Zhou
(74) *Attorney, Agent, or Firm* — Birch, Stewart, Kolasch & Birch, LLP

(57) ABSTRACT

The present invention relates to a system and a method for controlling a relay using a flip-flop, in which a flip-flop controlling a relay by receiving a signal of a control unit in a battery management system of a vehicle and supply flip-flop operation power to the flip-flop through a monitoring circuit connected to a battery of the vehicle when operation power of the battery management system of the vehicle is interrupted to maintain a closing state of a relay controlling driving power of the vehicle and to conserve power of the vehicle for a predetermined time.

17 Claims, 4 Drawing Sheets

(51) Int. Cl.
 *B60L 50/60* (2019.01)
 *B60L 3/00* (2019.01)
(58) Field of Classification Search
 USPC .......................................................... 320/134
 See application file for complete search history.

(56) References Cited

U.S. PATENT DOCUMENTS

| | | |
|---|---|---|
| 7,205,683 B2 | 4/2007 | Yoon |
| 8,547,065 B2 | 10/2013 | Trigiani |
| 9,878,620 B2 | 1/2018 | Mitsutani |
| 10,160,326 B2 | 12/2018 | Chung et al. |
| 10,784,800 B2 | 9/2020 | Hatakeyama |
| 2005/0213358 A1* | 9/2005 | Feldtkeller .......... H02M 3/3385 363/95 |
| 2005/0242778 A1* | 11/2005 | Lin ....................... H02J 7/0031 320/134 |
| 2018/0009317 A1* | 1/2018 | Chung ................... B60L 53/24 |

FOREIGN PATENT DOCUMENTS

| | | |
|---|---|---|
| JP | 6237665 B2 | 11/2017 |
| JP | 6458150 B2 | 1/2019 |
| KR | 10-1997-0008711 A | 2/1997 |
| KR | 10-2004-0051733 A | 6/2004 |
| KR | 10-2015-0068732 A | 6/2015 |
| KR | 10-2016-0086097 A | 7/2016 |
| KR | 10-1684085 B1 | 12/2016 |
| KR | 10-2018-0005008 A | 1/2018 |
| WO | WO 2018/123376 A1 | 7/2018 |

\* cited by examiner

[Figure 1]
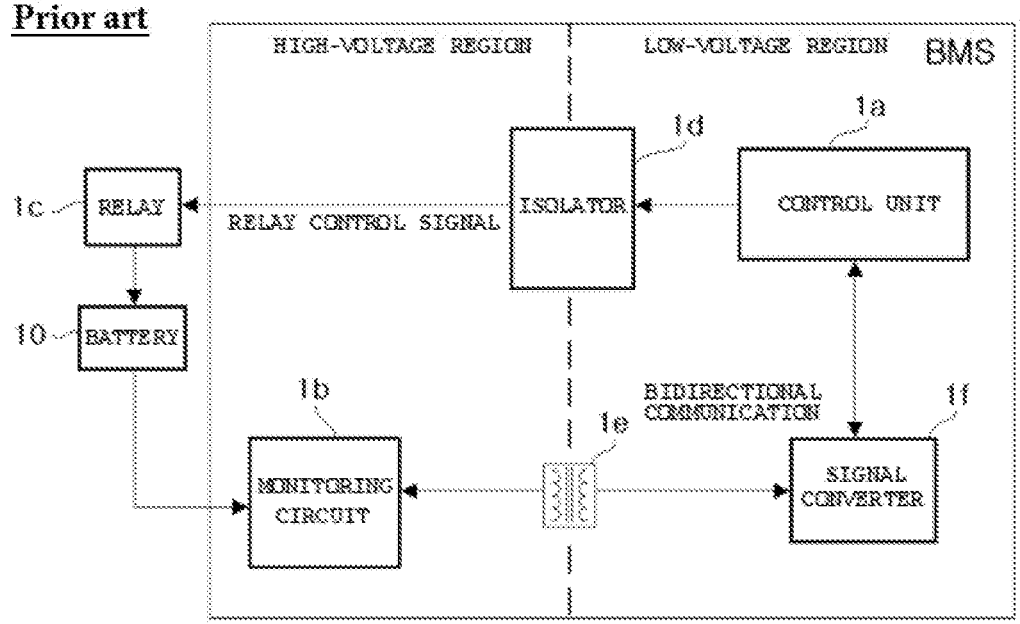
[Figure 2]
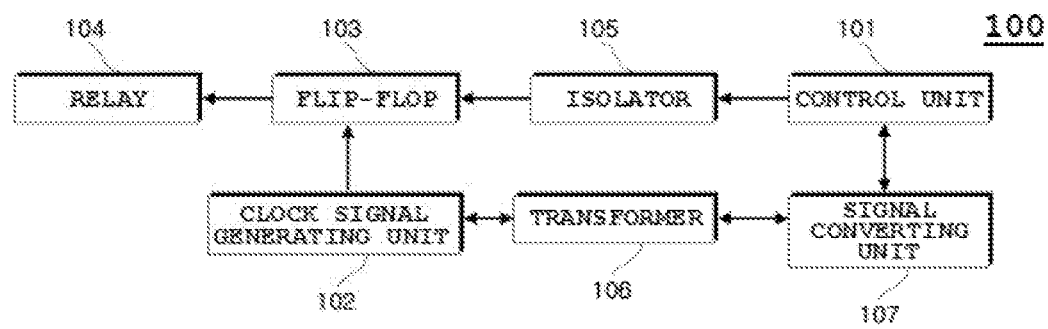

[Figure 4]
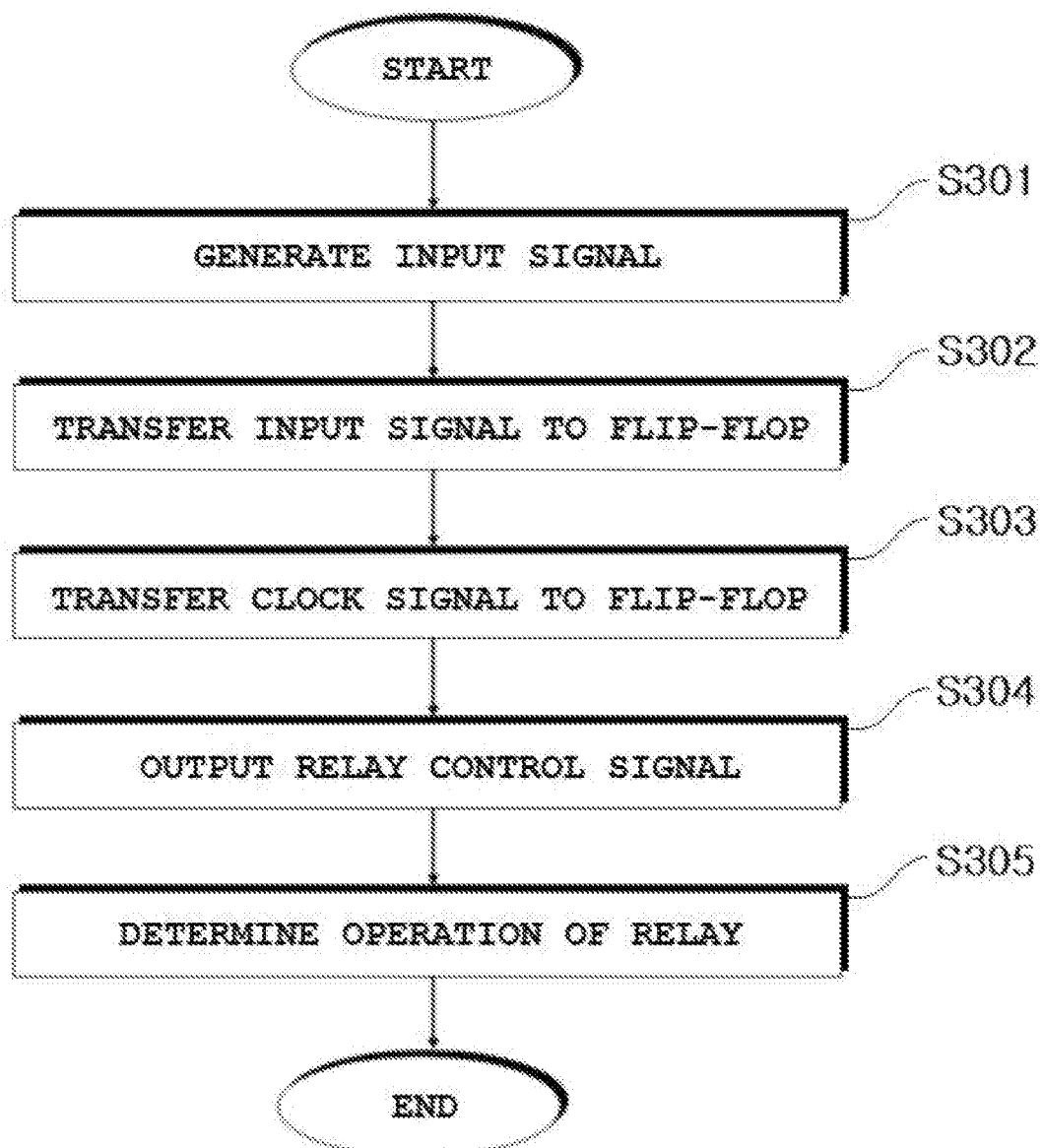

[Figure 5]
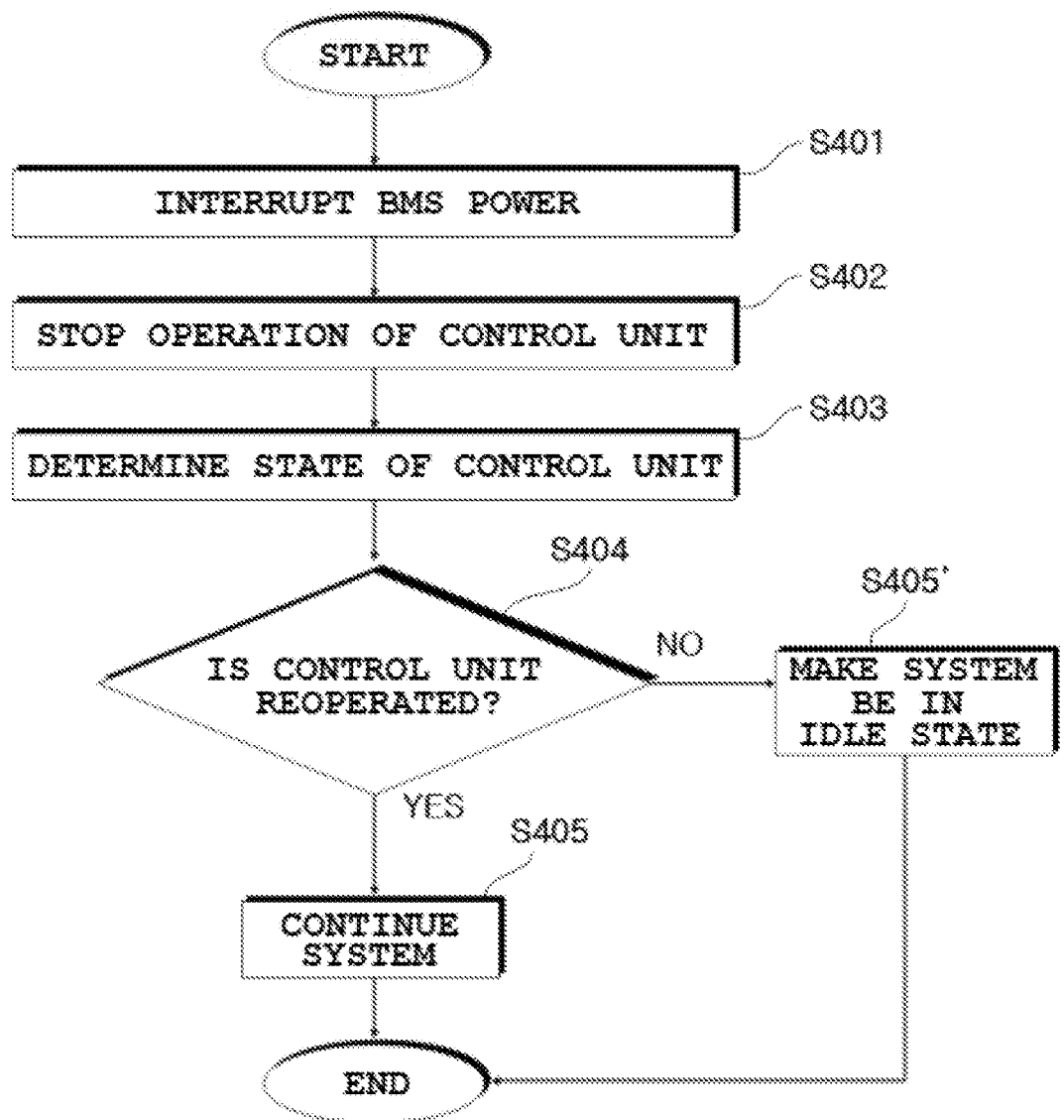

SYSTEM AND METHOD FOR CONTROLLING RELAY USING FLIP-FLOP

TECHNICAL FIELD

This application claims priority to and the benefit of Korean Patent Application No. 10-2018-0115723 filed in the Korean Intellectual Property Office on Sep. 28, 2018, the entire contents of which are incorporated herein by reference.

The present invention relates to a system and a method for controlling a relay using a flip-flop, and particularly, to a system and a method for controlling a relay using a flip-flop, which install a flip-flop controlling a relay by receiving a signal of a control unit in a battery management system of a vehicle and supply flip-flop operation power to the flip-flop through a monitoring circuit connected to a battery of the vehicle even when an operation power of the battery management system of the vehicle is interrupted to maintain a closing state of a relay controlling driving power of the vehicle and conserve power of the vehicle for a predetermined time.

BACKGROUND ART

A secondary battery which is high in application easiness according to a product group and has electrical characteristics including high energy density, and the like is universally applied to an electric vehicle (EV) driven by an electric driving source, a hybrid vehicle (HV) or an energy storage system (ESS) or an uninterruptible power supply (UPS) system using a medium/large battery used for a house or an industry as well as a portable device.

Future trends of an automotive industry using the secondary battery may be greatly concentrated on two types of an electric vehicle related to an eco-friendly issue and an autonomous vehicle maximizing convenience of a driver.

One of most important issues in two vehicles using the secondary battery may be an issue related to stability and there is a problem in that the power of the vehicle may also be immediately interrupted when a situation in which power supplied to a battery management system (BMS) controlling a battery of the vehicle is unexpectedly interrupted during driving occurs. In order to cope with a problem which occurs in such an emergency situation, a function may be required in which the power of the vehicle is not immediately interrupted, but maintained for a predetermined time at the time of interrupting a battery management system operation power to cope with the emergency situation.

DETAILED DESCRIPTION OF THE INVENTION

Technical Problem

The present invention is contrived to solve the problem and has been made in an effort to transfer a system and a method for controlling a relay using a flip-flop which install a flip-flop capable of controlling a relay by receiving a signal of a control unit in a battery management system of a vehicle and supply flip-flop operation power to the flip-flop through a monitoring circuit connected to a battery of the vehicle even when an operation power of the battery management system of the vehicle is unexpectedly interrupted to maintain a closing state of a relay controlling driving power of the vehicle and conserve power of the vehicle for a predetermined time, thereby coping with an emergency situation.

Technical Solution

According to embodiment of the present invent or, system for controlling a relay using a flip-flop may include: a control unit configured to generate an input signal for outputting a relay control signal; a clock signal generating unit configured to transmit and receive a communication signal to and from the control unit and generate a clock signal for outputting the relay control signal; a flip-flop configured to receive the clock signal and the input sinal and output the relay control signal based on the received clock signal and input signal; and a relay configured to receive the relay control signal and transit an operation state based on the received relay control signal.

In an embodiment, the system may further include: a BMS including a high-voltage region and a low voltage region, wherein the BMS includes the control unit, the clock signal generating unit and the flip flop, an isolator positioned over a boundary between the high-voltage region and the low-voltage region of the BMS and configured to prevent power collision between the high-voltage region and the low-voltage region; a transformer positioned over the boundary between the high-voltage region and the low-voltage region of the BMS and configured to transfer the communication signal generated by the clock signal generating unit from the high-voltage region to the low-voltage region and to transfer the communication signal generated by the control unit from the low-voltage region to the high-voltage region; and a signal converting unit positioned on a communication connection path of the control unit and the clock sizral generating unit and configured to the communication signal so as to be detected by both the control unit and the clock signal generating unit.

In an embodiment, the control unit may be positioned in the low-voltage region in the BMS and may be configured to receive BMS power for operating the BMS.

In an embodiment, the clock signal generating unit may be positioned in the high-voltage region in the BMS, and is configured to operate by receiving battery power of a vehicle, and supply power to the flip-flop.

In an embodiment, the clock signal generating unit may be configured to transfer the clock signal to the flip-flop until, the operation state of the relay is transited to a closed state when the input signal generated by the control unit is transferred to the flip-flop and stop generation of the clock signal when it is confirmed that the operation state of the relay is the closed state.

In an embodiment, the clock signal generating unit may be configured to transfer the clock signal to the flip-flop until the operation state of the relay is transited to an opened state when the communication signal for interrupting the power of the battery of the vehicle is transferred from the control unit and stop generation of the clock signal when it is confirmed that the operation state of the relay is the opened state.

In an embodiment, when the communication signal is not transferred from the control unit while the relay is in the closed state, the clock signal generating unit may be configured to maintain power supply to the flip-flop for a predetermined time and interrupt the power supply to the flip-flop when a predetermined time elapses.

In an embodiment, the flip-flop may include a D flip-flop type logic circuit.

In an embodiment, the relay may include a semiconductor relay including a metal oxide semiconductor field effect transistor (MOSFET).

According to another embodiment of the present invention, a method for controlling a relay using a flip-flop may include: generating, by a control unit, an input signal for outputting a relay control signal; transmitting and receiving, by a clock signal generating unit, a communication signal to and from the control unit, generating, by the clock signal generating unit, a clock signal for outputting the relay control signal; receiving, by a flip-flop, the clock signal and the input signal, outputting, by the flip-flop, the relay control signal based on the received clock signal and input signal, receiving, by a relay, the relay control signal, and transiting, by the relay, an operation state based on the received relay control signal.

In an embodiment, the transmitting and receiving, by the clock signal generating unit, the communication signal to and from the control unit and generating the clock signal for outputting the relay control signal may include transferring the clock signal to the flip-flop until the operation state of the relay is transited to a closed state when the input signal generated by the control unit is transferred to the flip-flop and stopping generation of the clock signal when it is confirmed that the operation state of the relay is the closed state.

In an embodiment, the transmitting and receiving, by the clock signal generating unit, the communication signal to and from the control unit and generating the clock signal for outputting the relay control signal may include transferring the clock signal to the flip-flop until the operation state of the relay is transited to an opened state when the communication signal for interrupting the power of the battery of the vehicle is transferred from the control unit to the clock signal generating unit and stopping generation of the clock signal when it is confirmed that the operation state of the relay is the opened state.

In an embodiment, the transmitting and receiving, by the clock signal generating unit, the communication signal to and from the control unit and generating the clock signal for outputting the relay control signal may include when the communication signal is not transferred from the control unit while the relay is in the closed state, maintaining power supply to the flip-flop for a predetermined time and interrupting the power supply to the flip-flop when a predetermined time elapses.

According to yet another embodiment of the present invention, a battery management system may include: a control unit configured to generate an input signal for outputting a relay control signal; a clock signal generating unit configured to transmit and receive a communication signal to and from the control unit and generate a clock signal for outputting the relay control signal; and a flip-flop receiving the clock signal and the input signal and outputting the relay control signal based on the received clock signal and input signal.

In an embodiment, the battery management system may further include: a BMS including a high-voltage region and a low voltage region, wherein the BMS includes the control unit, the clock signal generating unit and the flip flop; an isolator positioned over a boundary between the high-voltage region and the low-voltage region of the BMS and configured to prevent power collision between the high-voltage region and the low-voltage region; a transformer positioned over the boundary between the high-voltage region and the low-voltage region of the BMS and configured to transfer the communication signal transferred at the high-voltage region side to the low-voltage region and transfer the communication signal transferred at the low-voltage region side to the high-voltage region; and a signal converting unit positioned on a communication connection path of the control unit and the clock signal generating unit and configured to convert the communication signal so as to be detected by both the control unit, and the clock signal generating unit.

Advantageous Effects

A system and a method for controlling a relay using a flip-flop according to embodiments of the present invention install a flip-flop in a battery management system of a vehicle and supply flip-flop operation power to the flip-flop through a monitoring circuit connected to a battery of the vehicle even when an operation power of the battery management system of the vehicle is unexpectedly interrupted to maintain a closing state of a relay controlling driving power of the vehicle and conserve power of the vehicle for a predetermined time, thereby coping with an emergency situation.

BRIEF DESCRIPTION OF DRAWINGS

FIG. 1 is a diagram illustrating a shape of a relay control system 1 in the related art.

FIG. 2 is a diagram illustrating a configuration of a system 100 for controlling a relay using a flip-flop according to an embodiment of the present invention.

FIG. 4 is a flowchart for describing a relay control process through a system 100 for controlling a relay using a flip-flop according to an embodiment of the present invention.

FIG. 5 is a flowchart for describing a progress process of an application example of applying a system 100 for controlling a relay using a flip-flop according to the present invention.

BEST MODE

Figure 3:
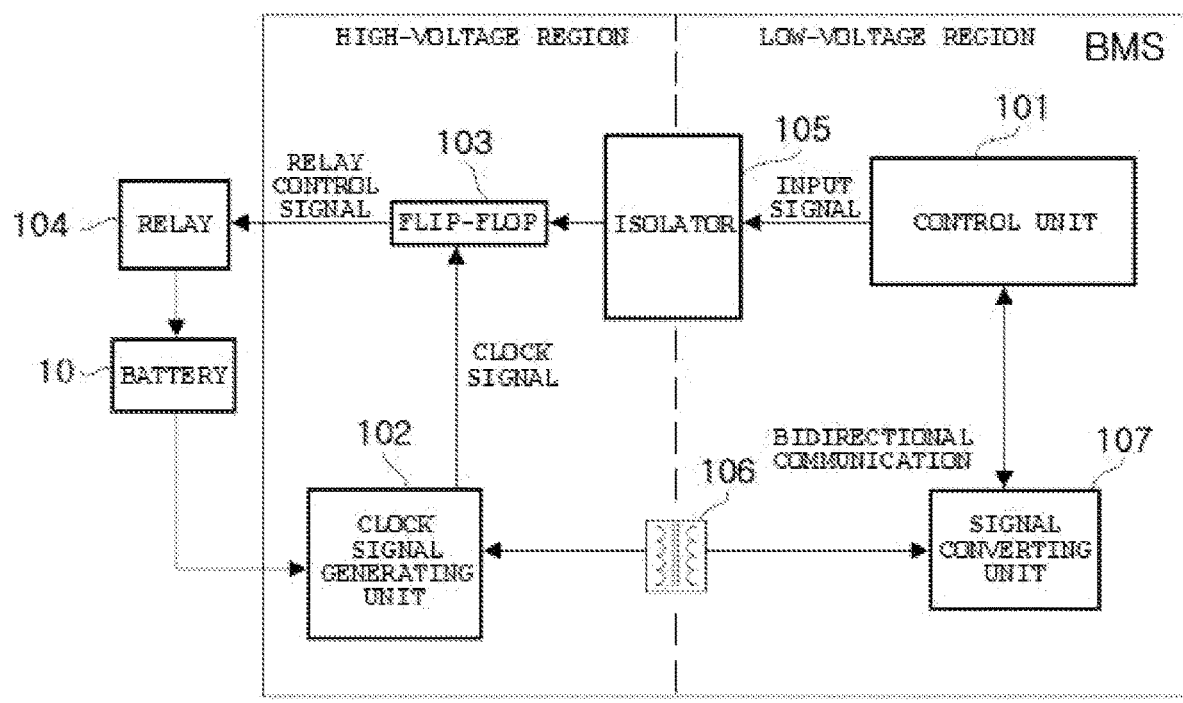
FIG. 3 is a diagram more specifically illustrating a system 100 for controlling a relay using a flip-flop according to an embodiment of the present invention.

The present invention will be described below in detail with reference to the accompanying drawings. Herein, the repeated description and the detailed description of publicly-known function and configuration that may make the gist of the present invention unnecessarily ambiguous will be omitted. Embodiments of the present invention are provided for more completely describing the present invention to those skilled in the art. Accordingly, shapes, sizes, and the like of elements in the drawings may be exaggerated for clearer explanation.

Throughout the specification, unless explicitly described to the contrary, a case where any part "includes" any component will be understood to imply the inclusion of stated components but not the exclusion of any other component.

In addition, the term ". . . unit" disclosed in the specification means a unit that processes at least one function or operation, and the unit may be implemented by hardware or software or a combination of hardware and software.

FIG. 1 is a diagram illustrating a shape of a relay control system 1 in the related art.

Referring to FIG. 1, in the relay control system 1 in the related art, an input signal of a control unit 1a is transferred to a relay 1c through an isolator 1d and an operation state of the relay 1c is monitored by a monitoring circuit 1b and is controlled and a connection state between a vehicle and a battery 10 is changed according to the operation state of the relay 1c, and a bidirectional communication 1e is connected between the monitoring circuit 1b and a signal converter and the signal converter 1f communicates with the control unit 1a.

Here, the battery 10 may mean a main power supply capable of driving the vehicle and mean a battery cell included in a battery pack mounted on the vehicle.

More specifically, in the relay control system 1, since whether the battery 10 is interrupted is determined by controlling the operation state of the relay 1c through the input signal of the control unit 1a, when a function of the control unit 1a is stopped or the power is interrupted, the input signal is not generated, and as a result, the relay 1c deviates from the control and the battery 10 is interrupted, and as a result, the power of the vehicle is also lost.

The relay control system 1 has a problem in that when a problem occurs in the BMS of the vehicle which is driven or the power is interrupted, power loss of the vehicle is immediately followed, and as a result, it is difficult to cope with the emergency situation.

FIG. 2 is a diagram illustrating a configuration of a system 100 for controlling a relay using a flip-flop according to an embodiment of the present invention and FIG. 3 is a diagram more specifically illustrating a system 100 for controlling a relay using a flip-flop according to an embodiment of the present invention.

Referring to FIGS. 2 and 3, the system 100 for controlling a relay using a flip-flop according to an embodiment of the present invention may be configured to generally include a control unit 101, a clock signal generating unit 102, a flip-flop 103, and a relay 104. Further, additionally, in an embodiment, the system 100 may be configured to further include an isolator 105, a transformer 106, and a signal converter 107. The system 100 for controlling a relay using a flip-flop illustrated in FIGS. 2 and 3 follows the embodiment and constituent elements thereof are not limited to the embodiment illustrated in FIGS. 2 and 3 and as necessary, some constituent elements may be added, modified, or deleted.

First, the control unit 101 may generate an input signal for outputting a relay control signal.

Further, the control unit 101 may be positioned in a low-voltage region in the battery management system (BMS) and operated by receiving BMS power for operating the BMS.

Here, an inner part of the BMS may be divided into a high-voltage region and a low-voltage region, and the high-voltage region may mean a region where a circuit and elements which may be directly or indirectly connected to the battery 10 of the vehicle and may use or handle voltage of approximately several hundred voltage or higher are positioned and the low-voltage region may mean a region where a circuit and elements which may use or handle voltage of approximately 10 volt or lower are positioned.

Next, the clock signal generating unit 102 may generate a clock signal for transmitting and receiving a communication signal with the control unit 101 and outputting a relay control signal.

Further, the clock signal generating unit 102 may be positioned in the high-voltage region in the BMS, operated by receiving the power of the battery 10 of the vehicle, and may supply the power to the flip-flop 103.

Further, the clock signal generating unit 102 may transfer the clock signal to the flip-flop 103 until the operation state of the relay 104 is transited to the closed state when the input signal generated by the control unit 101 is transferred to the flip-flop 103 and stop generation of the clock signal when it is confirmed that the operation state of the relay 104 is the closed state.

Further, the clock signal generating unit 102 may transfer to the clock signal to the flip-flop 103 until the operation state of the relay 104 is transited to an opened state when the communication signal for interrupting the power of the battery 10 of the vehicle is transfened from the control unit 101 and may stop generation of the clock signal when it is confirmed that the operation state of the relay 104 is the opened state.

In addition, when the communication signal is not transferred from the control unit 101 while the relay 104 is in the closed state, the clock signal generating unit 102 may maintain power supply to the flip-flop 103 for a predetermined time and interrupt the power supply to the flip-flop 103 when a predetermined time elapses.

Here, the predetermined time may be a fixed value preset in the clock signal generating unit 102 and a value changed through the input of a user into the BMS, and the predetermined time in the embodiment may be 60 seconds.

Specifically, as an example, while the clock signal generating unit 102 performs bidirectional communication with the control unit 101 in a state in which the relay 104 is in the closed state, if the communication signal is not transferred from the control unit 101, the clock signal generating unit 102 continuously determines a state of the control unit 101 by attempting communication with the control unit 101 for 60 seconds. During 60 seconds, in order to prevent the power of the vehicle from being lost, the closed state of the relay 104 is maintained by maintaining the power supply to the flip-flop 103 for 60 seconds and even though 60 seconds elapses, if the communication signal is not transferred from the control unit 101, the clock signal generating unit 102 interrupts the power supply to the flip-flop 103 while being switched to an idle state.

Next, the flip-flop 103 may receive the clock signal and the input signal and output the relay control signal based on the received clock signal and input signal.

Here, the flip-flop 103 may include a D flip-flop type logic circuit.

Specifically, for example, when the flip-flop 103 receives the clock signal transferred from the clock signal generating unit 102, the flip-flop 103 may output an input value of the input signal transferred from the control unit 101 as the output value as it is. Accordingly, when an input signal for transiting the relay 104 to the closed state or opened state is transferred to the flip-flop 103, the control unit 101 may allow the clock signal generating unit 102 to continuously output an initial input value as an output value when stopping generation of the clock signal after allowing the flip-flop 103 to output the input value and stop generation of the clock signal by transferring a clock signal of approximately one period to the flip-flop 103.

Next, the relay 104 may receive the relay control signal and transit the operation state based on the received relay control signal.

Here, the relay 104 may mean a semiconductor relay including a metal oxide semiconductor field effect transistor (MOSFET).

Next, the isolator 105 may be positioned over a boundary between the high-voltage region and the low-voltage region of the BMS and may prevent power collision between the high-voltage region and the low-voltage region.

Here, the isolator 105 may transfer the input signal transferred from the control unit 101 in the low-voltage region to the flip-flop 103 of the high-voltage region without a power collision between the high-voltage region and the low-voltage region.

Next, the transformer 106 may be positioned on a boundary between the high-voltage region and the low-voltage region of the BMS, the communication signal generated by the clock signal generating unit 102 and transferred from the high-voltage region side is transferred to the low-voltage region and the communication signal generated by the control unit 101 and transferred from the low-voltage region may be transferred to the high-voltage region.

Next, the signal converting unit 107 may be positioned on a communication connection path of the control unit 101 and the clock signal generating unit 102 and convert the communication signal to be detected by both the control unit 101 and the clock signal generating unit 102.

Here, communication made between communication connection paths of the signal converting unit 107 and the control unit 101 may include Serial Peripheral Interface (SPI) communication.

Next, a relay control process through the system 100 for controlling a relay using a flip-flop will be described through FIG. 4.

FIG. 4 is a flowchart for describing a relay control process through a relay control system using the flip-flop illustrated in FIGS. 2 and 3.

Referring to FIG. 4, first, a control unit generates an input signal for outputting a relay control signal (S301) and transfers the generated input signal to the flip-flop in the high-voltage region through an isolator.

Next, the clock signal generating unit generates the clock signal (S302) and transfers the generated clock signal to the flip-flop through the bidirectional communication with the control unit (S303).

Next, the flip-flop outputs the relay control signal according to a logic circuit of a D flip-flop based on the transferred input signal and clock signal (S304) and the relay receives the relay control signal generated by the flip-flop and determines the operation state to interrupt or connect the battery (S305).

Next, a progress process of an application example of applying the system 100 for controlling a relay using a flip-flop will be described with reference to FIG. 5.

FIG. 5 is a flowchart for describing a progress process in an application example of applying the system for controlling a relay using a flip-flop illustrated in FIGS. 2 and 3.

Referring to FIG. 5, first, when a situation in which the power of the BMS is interrupted occurs due to a problem which is not intended or may not be known by a user occurs in the BMS (S401), the control unit which is positioned in the BMS and operated by sharing the power of the BMS also stops the function (S402).

Next, when the clock signal generating unit does not receive the communication signal from the control unit, the clock signal generating unit continuously determines the state of the control unit by attempting communication to the control unit for a predetermined time (S403).

Here, when the function of the control unit is recovered within a predetermined time and the communication is resumed again (S404), the clock signal generating unit maintains power supply to the flip-flop, and as a result, the relay control system using the flip-flop is continued (S405).

Meanwhile, when the function of the control unit is not recovered within the predetermined time and the communication is not resumed, the clock signal generating unit is switched to the idle state after a predetermined time elapses, and as a result, the power supplied to the flip-flop is interrupted and the power of the vehicle is interrupted (S405').

The aforementioned method for relaying the relay using the flip-flop has been described with reference to the flowcharts presented in the drawings. The method has been shown and described by a series of blocks for easy description, but it is to be understood that the present invention is not limited to the order of the blocks, and that some blocks may be generated in different orders from and concurrently with other blocks as shown and described in the present specification, and various other branches, flow paths, and orders of blocks may be implemented to achieve the same or similar result. In addition, all illustrated blocks may not be required for the implementation of the method described in the present specification.

The present invention has been described with reference to the preferred embodiments of the present invention, but those skilled in the art will understand that the present invention can be variously modified and changed without departing from the spirit and the scope of the present invention which are defined in the appended claims.

The invention claimed is:

1. A system for controlling a relay using a flip-flop, the system comprising:
    a control unit configured to generate an input signal for outputting a relay control signal;
    a clock signal generating unit configured to:
        transmit and receive a communication signal to and from the control unit, and
        generate a clock signal for outputting the relay control signal;
    the flip-flop configured to:
        receive the clock signal and the input signal, and
        output the relay control signal based on the received clock signal and input signal;
    the relay configured to:
        receive the relay control signal, and
        transmit an operation state based on the received relay control signal;
    a battery management system (BMS) including a high-voltage region and a low voltage region, wherein the BMS includes the control unit, the clock signal generating unit and the flip flop,
    wherein the flip-flop is disposed in the high-voltage region of the BMS and receives voltage from the high-voltage region and the control unit is disposed in the low-voltage region of the BMS and receives voltage from the low-voltage region.

2. The system of claim 1, further comprising:
    an isolator positioned over a boundary between the high-voltage region and the low-voltage region of the BMS and configured to prevent power collision between the high-voltage region and the low-voltage region;
    a transformer positioned over the boundary between the high-voltage region and the low-voltage region of the BMS and configured to transfer the communication signal generated by the clock signal generating unit from the high-voltage region to the low-voltage region and to transfer the communication signal generated by the control unit from the low-voltage region to the high-voltage region; and
    a signal converting unit positioned on a communication connection path of the control unit and the clock signal generating unit and configured to convert the communication signal so as to be detected by both the control unit and the clock signal generating unit.

3. The system of claim 1, wherein the control unit is configured to receive BMS power for operating the BMS.

4. The system of claim 1, wherein the clock signal generating unit is positioned in the high-voltage region in the BMS, and is configured to:
  operate by receiving battery power of a vehicle, and
  supply power to the flip-flop.

5. The system of claim 1, wherein the clock signal generating unit is configured to:
  transfer the clock signal to the flip-flop until the operation state of the relay is transited to a closed state when the input signal generated by the control unit is transferred to the flip-flop, and
  stop generation of the clock signal when the operation state of the relay is the closed state.

6. The system of claim 4, wherein the clock signal generating unit is configured to transfer the clock signal to the flip-flop until the operation state of the relay is changed to an opened state when the communication signal for interrupting the power of the battery of the vehicle is transferred to the control unit, and
  stop generation of the clock signal when the operation state of the relay is the opened state.

7. The system of claim 4, wherein when the communication signal is not transferred from the control unit while the relay is in the closed state, the clock signal generating unit is configured to:
  maintain power supply to the flip-flop for a predetermined time, and interrupt the power supply to the flip-flop when a predetermined time elapses.

8. The system of claim 1, wherein the flip-flop includes a D flip-flop type logic circuit.

9. The system of claim 1, wherein the relay is a semiconductor relay including a metal oxide semiconductor field effect transistor (MOSFET).

10. A method for controlling a relay using a flip-flop, the method comprising:
  generating, by a control unit, an input signal for outputting a relay control signal;
  transmitting and receiving, by a clock signal generating unit, a communication signal to and from the control unit;
  generating, by the clock signal generating unit, a clock signal for outputting the relay control signal;
  receiving, by the flip-flop, the clock signal and the input signal;
  outputting, by the flip-flop, the relay control signal based on the received clock signal and input signal;
  receiving, by the relay, the relay control signal; and
  transmitting, by the relay, an operation state based on the received relay control signal; and
  providing a battery management system (BMS) including a high-voltage region and a low voltage region, wherein the BMS includes the control unit, the clock signal generating unit and the flip flop,
  wherein the flip-flop is disposed in the high-voltage region of the BMS and receives voltage from the high-voltage region and the control unit is disposed in the low-voltage region of the BMS and receives voltage from the low-voltage region.

11. The method of claim 10, wherein the transmitting and receiving, by the clock signal generating unit, the communication signal to and from the control unit and generating the clock signal for outputting the relay control signal includes:
  transferring, by the clock signal generating unit, the clock signal to the flip-flop until the operation state of the relay is transited to a closed state when the input signal generated by the control unit is transferred to the flip-flop; and
  stopping generation of the clock signal when the operation state of the relay is the closed state.

12. The method of claim 10, wherein the transmitting and receiving, by the clock signal generating unit, the communication signal to and from the control unit and generating the clock signal for outputting the relay control signal includes:
  transferring, by the clock signal generating unit, the clock signal to the flip-flop until the operation state of the relay is transited to an opened state when the communication signal for interrupting the power of the battery of the vehicle is transferred from the control unit to the clock signal generating unit; and
  stopping generation of the clock signal when it is confirmed that the operation state of the relay is the opened state.

13. The method of claim 10, wherein the transmitting and receiving, by the clock signal generating unit, the communication signal to and from the control unit and generating the clock signal for outputting the relay control signal includes:
  when the communication signal is not transferred from the control unit while the relay is in the closed state, maintaining power supply to the flip-flop for a predetermined time and interrupting the power supply to the flip-flop when a predetermined time elapses.

14. The method of claim 10, wherein the control unit is configured to receive BMS power for operating the BMS.

15. The method of claim 10, wherein the clock signal generating unit is positioned in the high-voltage region in the BMS, and is configured to:
  operate by receiving battery power of a vehicle, and
  supply power to the flip-flop.

16. A battery management system, comprising:
  a control unit configured to generate an input signal for outputting a relay control signal;
  a clock signal generating unit configured to:
    transmit and receive a communication signal to and from the control unit, and
    generate a clock signal for outputting the relay control signal;
  a flip-flop receiving the clock signal and the input signal and outputting the relay control signal based on the received clock signal and input signal; and
  a battery management system (BMS) including a high-voltage region and a low voltage region, wherein the BMS includes the control unit, the clock signal generating unit and the flip flop,
  wherein the flip-flop is disposed in the high-voltage region of the BMS and receives voltage from the high-voltage region and the control unit is disposed in the low-voltage region of the BMS and receives voltage from the low-voltage region.

17. The battery management system of claim 16, further comprising:
  an isolator positioned over a boundary between the high-voltage region and the low-voltage region of the BMS and configured to prevent power collision between the high-voltage region and the low-voltage region;
  a transformer positioned over the boundary between the high-voltage region and the low-voltage region of the BMS and configured to:

transfer the communication signal transferred at the high-voltage region to the low-voltage region, and transfer transferring the communication signal transferred at the low-voltage region to the high-voltage region; and
a signal converting unit positioned on a communication connection path of the control unit and the clock signal generating unit and configured to convert the communication signal so as to be detected by both the control unit and the clock signal generating unit.

* * * * *